Figure 1:
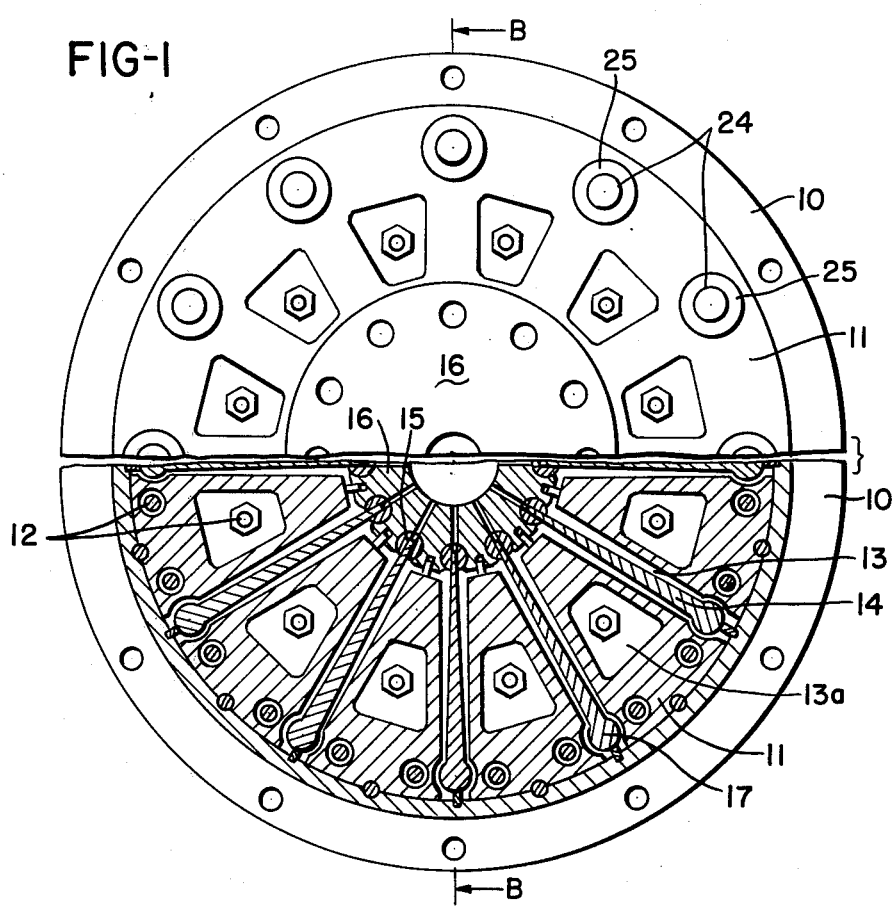

United States Patent [19]

Walter

[11] 4,337,629
[45] Jul. 6, 1982

[54] RESILIENT SHAFT COUPLING

[75] Inventor: Jürgen Walter, Haltern-Hullern, Fed. Rep. of Germany

[73] Assignee: Hackforth GmbH & Co., Herne, Fed. Rep. of Germany

[21] Appl. No.: 132,304

[22] Filed: Mar. 20, 1980

[30] Foreign Application Priority Data

Mar. 13, 1978 [DE] Fed. Rep. of Germany ....... 2810885

[51] Int. Cl.³ .......................... F16D 3/80; F16D 3/56
[52] U.S. Cl. .......................................... 464/24; 464/82
[58] Field of Search ........................ 64/26, 27 R, 27 L

[56] References Cited

U.S. PATENT DOCUMENTS

B. 509,043  2/1976  Geilinger ............................. 64/27 L

FOREIGN PATENT DOCUMENTS 2810885  9/1979  Fed. Rep. of Germany .......... 64/26

Primary Examiner—Ira S. Lazarus

Attorney, Agent, or Firm—Becker & Becker, Inc.

[57] ABSTRACT

A resilient shaft coupling having damping by liquid displacement. Resilient elements, which extend radially of the axis of rotation, are disposed between the driving and driven members of the coupling, the resilient elements being connected to the outer driven coupling member (the outer ring), and having their free ends received in axial recesses in the generated surface of the inner driving member of the coupling. Each resilient element extends between liquid-filled chambers bounded by filling elements, the liquid responding to a relative movement between the driving and driven members of the coupling by being displaced from the chamber into the adjacent chamber bounded by the resilient elements. The spring elements on their end faces have journal pins which engage, with the interposition of bearing sleeves, in corresponding bores in the outer driven coupling member, one or both of the journal pins being directly connected to the driven coupling member to rotate positively therewith.

2 Claims, 2 Drawing Figures

U.S. Patent

Jul. 6, 1982

4,337,629

RESILIENT SHAFT COUPLING

The present invention relates to a resilient shaft coupling having damping by liquid displacement. Resilient or spring elements, which extend radially of the axis of rotation, are disposed between the driving and driven members of the coupling, the resilient elements being connected to the outer driven coupling member (the outer ring), and having their free ends received in axial recesses in the generated surface of the inner driving member of the coupling. Each resilient element extends between liquid-filled chambers bounded by filling elements, the liquid responding to a relative movement between the driving and driven members of the coupling by being displaced from one chamber into the adjacent chamber bounded by the resilient elements.

German Pat. specification No. 1 202 590 discloses a resilient shaft coupling wherein torques are transmitted by leaf springs or spring strips which are distributed uniformly over the periphery, are disposed substantially radially, are clamped at their outer ends, and are compressed peripherally in the clamping zone; intermediate elements are provided which determine the spring strips and the spacing between them. In addition to the ring for clamping the spring strips, one or more inner rings are disposed concentrically, contact one annother along a conical surface, and in response to axial compression apply a radial pressure to the parts which are to be clamped and which bear on one another tangentially. The force required to clamp the spring strips and the intermediate members is very considerable, and since the force in the clamping ring must therefore also be very considerable, the latter ring must be very thick. The clamping ring is therefore relatively heavy, as a result of which the outer gyrating masses are of course excessively large. The additional clamping by a number of concentric inner rings causes a further considerable increase in the size of the outer gyrating masses. Also, the outer ring must be further materially increased yet again, since some of the spring length necessary for the resilience of the coupling is lost as a result of the clamping, and so the spring length must be lengthened by these clamping rings. Consequently, the coupling diameter is increased by twice the clamping length of the spring.

It is an object of the present invention to obviate these disadvantages and to provide a coupling in which, unlike known couplings, the spring elements do not have to be pressed in radially but have a suspension independennt of external forces, the torsional resilience of the coupling being increased considerably for a given outer diameter of the coupling casing by the spring element being mounted in the driven outer ring, and by using the entire spring length.

This feature enables the length of the torsion bars to be relatively short for a given torsional resilience.

Figure 2:
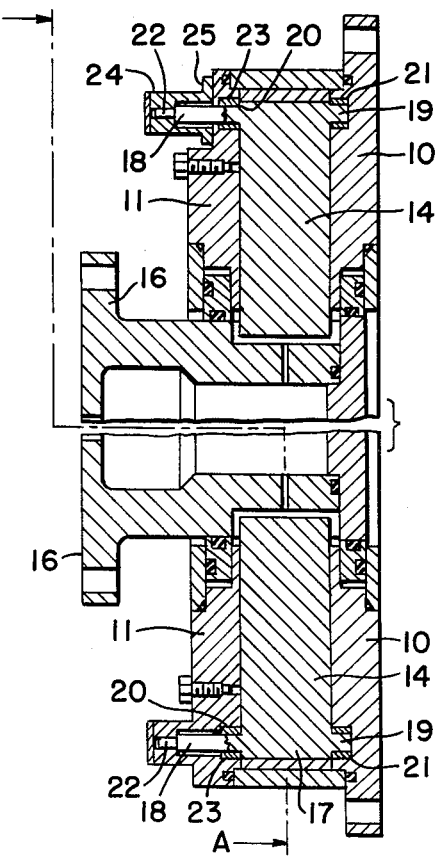

This object, and other objects and advantages of the present invention, will appear more clearly from the following specification in connection with the accompanying drawings, in which:

FIG. 1 is an elevational view in its top half, and a section on the line A-A of FIG. 2 in its bottom half; and FIG. 2 is a section on the line B-B of FIG. 1.

The resilient shaft coupling of the present invention is characterized primarily in that the spring elements have on their end faces journal pins which engage, with the interposition of bearing sleeves, in corresponding bores in the outer driven coupling member, one or both of the journal pins being directly connected to the driven coupling member to rotate positively therewith.

The omission of the clamping ring and of the additional concentric inner rings enables the entire spring length to come into operation, and increases not only the torsional resilience of the coupling but also the pumping action by the spring elements. The heavy and complicated tools required for conventional couplings to clamp the spring elements in the outer coupling member also become superfluous. The journal pins of the spring elements, since they are directly connected in the outer coupling member so as to be positive in rotation, become torsion bars, with the result that torsional resiliences can be varied within wide limits for a given outer diameter. Another advantage can be provided if one or both journal pins are so engaged indirectly in torsionally resilient torsion tubes extending concentrically around the, or each of the, journal pins so as to rotate positively with such tubes, the same being so disposed on the driven member as to rotate positively therewith.

Referring now to the drawing in detail, the resilient shaft coupling has a driven outer member 10 and comprises an intermediate flange 11 rigidly secured to the outer member 10 by screws 12. Flange 11 is devised to have liquid-receiving chambers 13. Spring elements 14 extend into these chambers, subdividing each of them into two chambers 13, 13a.

The free ends of the spring elements 14 are mounted in axial recesses or grooves 15 in the inner driving coupling member 16. As FIG. 2 shows, the outer ends 17 of the spring elements 14 are in the form of journal pins 18, 19 which in this embodiment are mounted by means of bearing sleeves 20, 21 in the outer member 10 and in bores 23 in the flange 11, which is secured to the outer member 10.

The bottom half of FIG. 2 shows a journal pin 18 which has been elongated to form a torsion bar, and which is so connected by a member 22 to the coupling outer member—in this case to the intermediate flange 11—as to rotate positively with the coupling outer member.

The embodiment shown in the top half of FIG. 2 comprises a journal pin 18 which has been elongated to form a torsion bar and which is mounted by means of a member 22 in a torsionally resilient torsion tube 24, the latter being so disposed by flanges 25 and the intermediate flange 11 on the driven coupling member 10 as to rotate positively therewith.

Of course, the journal pin 19 can also take the form of a torsion bar.

The present invention is, of course, in no way restricted to the specific disclosure of the specification and drawing, but also encompasses any modifications within the scope of the appended claims.

What I claim is:

1. A resilient shaft coupling having damping by liquid displacement, said coupling comprising:
   an inner driving member having recesses located in the generated surface thereof and extending in the axial direction;
   an outer driven member having liquid-filled chambers bounded by filling elements;
   a plurality of resilient elements connected to said outer coupling member, extending radially of the axis of rotation of said coupling, and disposed between said inner and outer members, the radially inner free ends of said resilient elements being received in said axial recesses of said inner member, each of said resilient elements extending between some of said liquid-filled chambers in such a way that liquid responds to relative movement between said inner and outer members by being displaced from one of said chambers to an adjacent chamber bounded by one of said resilient elements;

two journal pins respectively provided on each of said resilient elements on those lateral end faces thereof at that end of said resilient element opposite said free end, said outer member having corresponding bores for receiving respective journal pins therein; and bearing sleeves respectively interposed between said journal pins and said corresponding bores in said outer member, at least one of said two journal pins of each resilient element being directly connected with said outer driven member in such a way as to rotate positively therewith.

2. A resilient shaft coupling according to claim 1, which, for each of said resilient elements, includes at least one torsionally resilient torsion tube for respective indirect engagement by one of said journal pins in such a way as to rotate positively therewith, said torsion tubes extending concentrically around a pertaining journal pin and arranged on said outer driven member in such a way as to rotate positively therewith.

* * * * *